United States Patent [19]

Thompson et al.

[11] 4,412,965
[45] Nov. 1, 1983

[54] METHOD OF MAKING AN AIR SPRING

[75] Inventors: Donald R. Thompson, Wadsworth; Robert H. Vogliano, Akron, both of Ohio

[73] Assignee: The Goodyear Tire & Rubber Company, Akron, Ohio

[21] Appl. No.: 299,762

[22] Filed: Sep. 8, 1981

[51] Int. Cl.³ ............................ B29D 3/02; B29H 3/08
[52] U.S. Cl. .................... 264/257; 156/117; 156/125; 156/245; 264/328.3
[58] Field of Search .............. 264/257, 258, 314, 326, 264/328.3; 156/414, 417–420, 125, 130, 131, 130.3, 130.7, 130.5, 131, 132, 133, 135, 117, 245

[56] References Cited

U.S. PATENT DOCUMENTS

| | | | |
|---|---|---|---|
| 1,637,195 | 7/1927 | Kuhn | 156/417 |
| 1,667,263 | 4/1928 | Mather | 156/133 |
| 1,733,405 | 10/1929 | Gammeter | 156/132 |
| 1,870,661 | 8/1932 | Vogt | 264/257 |
| 2,182,176 | 12/1939 | Maranville | 156/132 |
| 2,476,884 | 7/1949 | Maynard | 264/326 |
| 2,724,425 | 11/1955 | Ostling | 264/328.3 |
| 2,873,790 | 2/1959 | Cadwell et al. | 264/328.3 |
| 2,929,101 | 3/1960 | Davis | 264/324 |
| 3,229,013 | 1/1966 | Newton et al. | 156/125 |
| 3,956,448 | 5/1976 | Larson | 264/328.3 |

Primary Examiner—Willard E. Hoag
Attorney, Agent, or Firm—J. D. Wolfe; R. D. Thompson

[57] ABSTRACT

A method of making an air spring comprising spreading a fabric around a core having the shape of said air spring, anchoring edges of said fabric in overlap area to the core to form a reinforcing member thereon, placing the core having the reinforcing member thereon in a mold, closing said mold, injecting an elastomeric precursor into the mold and curing to form said air spring.

3 Claims, 4 Drawing Figures

METHOD OF MAKING AN AIR SPRING

TECHNICAL FIELD

This invention relates to an improved method for making an air spring, and to said air spring. More particularly this invention relates to an air spring having the fabric preshaped prior to the injection molding of the elastomer over the fabric.

BACKGROUND

Air springs are made by calendaring or spread coating the fabric with an elastomer to give a rubberized fabric. The rubberized fabric is cut in plies and the plies are laid up over a builing drum to form the conventional rubberized fabric cylindrical preform. The cylindrical rubberized fabric preform is placed in a mold over a bladder, then the mold is closed and the bladder is inflated to shape the conventional rubberized fabric cylindrical in shape of an air spring, and the rubber is cured.

DISCLOSURE AND PRACTICE OF THE INVENTION

This invention provides a method of making an air spring without the need to first rubberize the fabric and build a preform that has to be molded to the shape of an air spring. By this method a fabric is spread around a core having the shape of said air spring, anchoring edges of said fabric in overlap area to the core to form a reinforcing member thereon, placing the core having the reinforcing member thereon in a mold, closing said mold, injecting an elastomeric precursor into the mold and curing it to form an air spring. Then the mold is opened and the core is collapsed so the air spring can be removed from over the core.

The nature of this invention, its advantages and attributes can be more readily seen and appreciated by reference to the drawings where FIG. 1 is a perspective view in elevation of an air spring core;

Figure 1:
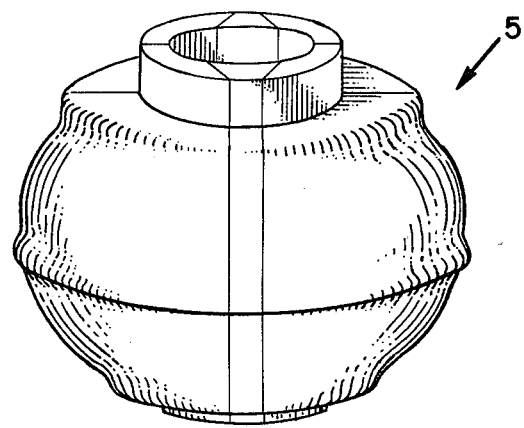
Figure 2:
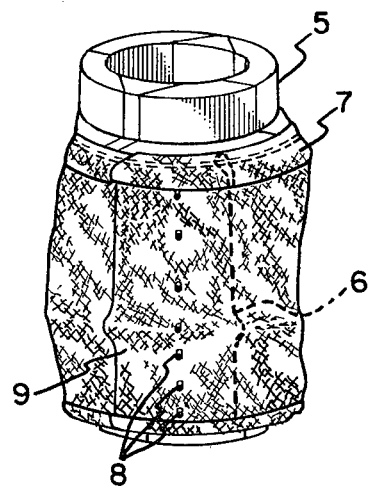
FIG. 2 is a partial vertical view of FIG. 1 showing the fabric anchored on the core.

Referring to the drawings the numeral 5 designates a collapsible split core which has the shape of the air spring in the expanded position but in the collapsed position the sections of the core move inward to reduce the periphery thereof so the core can be removed from the air spring for reuse.

An edge 6 of the fabric 7 is anchored on the pins 8 and is stretched around the core 5 to anchor the other end 9 on the pins 8 to thereby form the preform in the shape of the air spring. In some instances it is desirable to place wire beads over the fabric on the core to produce an air spring having greater resistance to being unseated in service. Where beads are used the fabric may be turned up over the bead wire and stitched in place with a suitable adhesive. Alternatively the gummed rubber fabric flap covering the bead wires can be stitched to the fabric on the core in the customary manner of building air springs.

Figure 3:
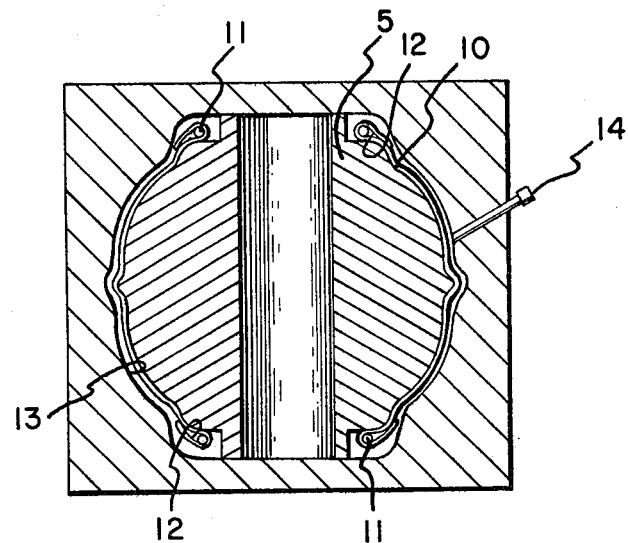
FIG. 3 is a cross-sectional elevational view through the mold showing the core with the fabric preform positioned therein in the molding relationship.
Figure 4:
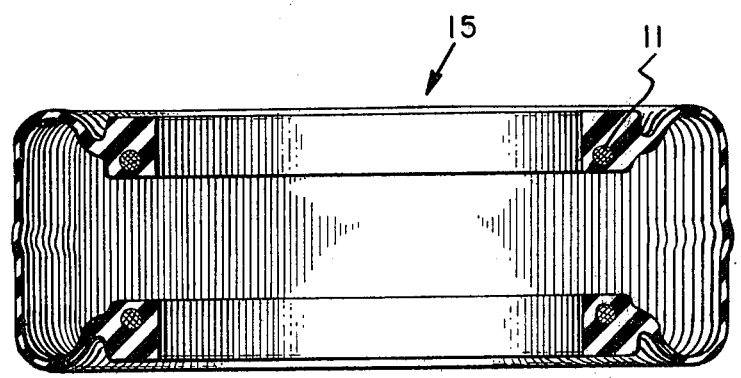
FIG. 4 is a partial sectional view through an air spring in compressed position.

The core 5 having a fabric preform 10 thereon shown in FIG. 3 has the fabric turned over the bead wires 11 and flap 12 of the bead wires is stitched against the fabric. The cavity 13 in the mold is filled with an elastomeric precursor through fill part 14 to encapsulate the fiber or to form the air spring when the precursor is cured.

A woven fabric that has essentially twice the strength in the warp as in the woof is preferred where the internal pressure on the air spring 15 is relatively high. A polyamide fabric, Kelvar 143 TM, a trademark of E. I. du Pont de Nemours & Company, of 5.6 ounces/square yard having a tensile of 2277 pounds per inch in warp and 1300 pounds per inch in woof is particularly desired where the internal pressure at 100 pounds per square inch is to be resisted. Nylon fabrics may also be used as well as polyester.

The elastomeric precursors can be any of those well known. The liquid or fluid polyurethane reaction mixtures particularly are amenable for use in this process. Also the mold can be placed under vacuum to remove the air and moisture to facilitate the urethane bonding to the fabric.

The polyurethane precursors are fluid reaction mixtures of either a prepolymer or one step mix containing the reactants, which in the case of the prepolymer has been prereacted, a reactive hydrogen containing material of about 1000 to 6000 molecular weight such as the well known polyether polyols, representative members being polytetramethylene ether glycol and polypropylene ether diol, the polyester polyols, representative members being the adipates, azelates, phthalates of the lower glycols and polycaprolactone diol, with an organic polyisocyanate, the representative ones being toluene diisocyanate, methane diphenyl isocyanate (MDI), hydrogenated MDI and isophorone diisocyanate, and a curative of the polyol or polyamine type. It is preferred that the polyurethane obtained by curing the precursor have an elongation of 200 to 500 percent, a tensile of at least 2000 p.s.i. and a Shore hardness of 60 to 80.

While certain representative embodiments and details have been shown for the purpose of illustrating the invention it will be apparent to those skilled in this art that various changes and modifications may be made therein without departing from the spirit or scope of the invention.

We claim:

1. A method for making an air spring comprising, spreading a fabric around a core having a desired air spring shape, overlapping ends of said fabric in an axially extending region of said core, anchoring the overlapping ends of said fabric to said core, placing the core and fabric in a mold, injecting an elastomeric material in said mold and curring said material in said mold to form an air spring having a fabric reinforcement.

2. The method of claim 1 wherein bead wires are attached to the core.

3. The method of claim 1 wherein the ends are pinned longitudinally to the core.

* * * * *